United States Patent [19]

Lipska

[11] 3,926,947

[45] Dec. 16, 1975

[54] CONTROLLED PYROLYSIS OF CELLULOSIC MATERIALS FOR PRODUCTION OF CHEMICALS

[75] Inventor: Anne E. Lipska, Palo Alto, Calif.

[73] Assignee: Stanford Research Institute, Menlo Park, Calif.

[22] Filed: June 17, 1974

[21] Appl. No.: 480,107

Related U.S. Application Data

[63] Continuation-in-part of Ser. No. 200,514, Nov. 19, 1971, abandoned.

[52] U.S. Cl.... 260/209 R; 260/210 R; 260/346.1 R; 260/528
[51] Int. Cl.$^2$............................................ C07H 3/08
[58] Field of Search............ 260/209 R, 210, 346.1, 260/528, 210 R, 346.1 R

[56] References Cited
UNITED STATES PATENTS

| | | | |
|---|---|---|---|
| 3,300,473 | 1/1967 | Christoffel et al. | 260/209 R |
| 3,309,355 | 3/1967 | Heritage et al. | 260/209 R |
| 3,522,230 | 7/1970 | Burkart | 260/209 R |

OTHER PUBLICATIONS

Wise et al., "Industrial and Engineering Chem.," Vol. 22, No. 4, Apr., 1930.

*Primary Examiner*—Johnnie R. Brown
*Attorney, Agent, or Firm*—Donovan J. De Witt

[57] ABSTRACT

By treating paper, newsprint, and other waste cellulosic materials with an acidic fire retardant chemical the product spectrum formed during ensuing pyrolysis of the treated materials is reduced from approximately 60 compounds, none of which is produced in amounts justifying recovery, to a small number of principal products, including water, acetic acid, furfural, 5-methyl-2-furfural and a compound produced in relatively large amounts which has been identified as 1,5-anhydro-3,4-dideoxy-$\Delta^3$-$\beta$-D-pyranosen-2-one. The latter compound has utility as a precursor to synthetic resins and surfactants and can be converted by oxidation to the novel compound, 1,5-anhydro-3,4-dihydroxy-$\Delta^3$-$\beta$-D-pyranosen-2-one.

3 Claims, 3 Drawing Figures

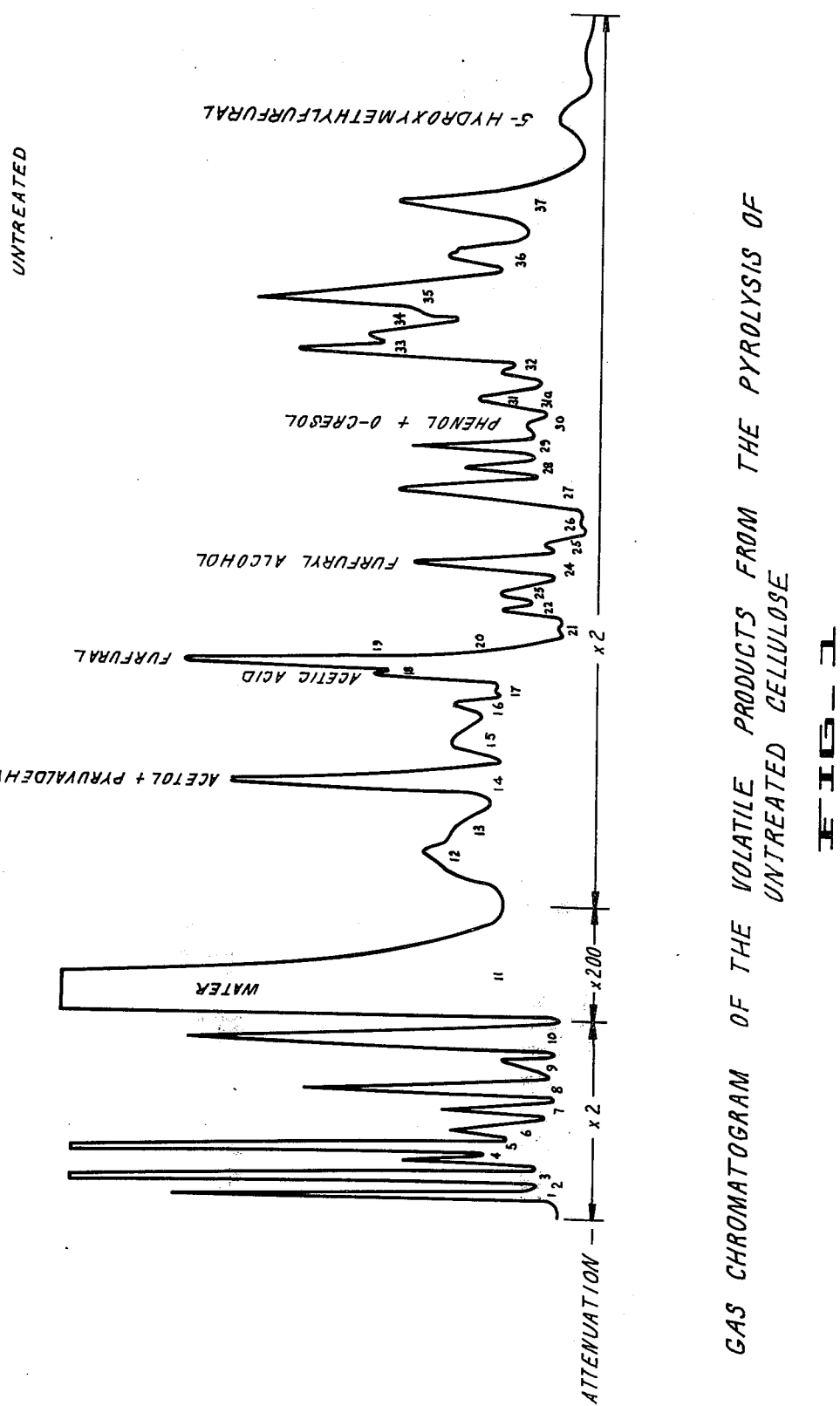

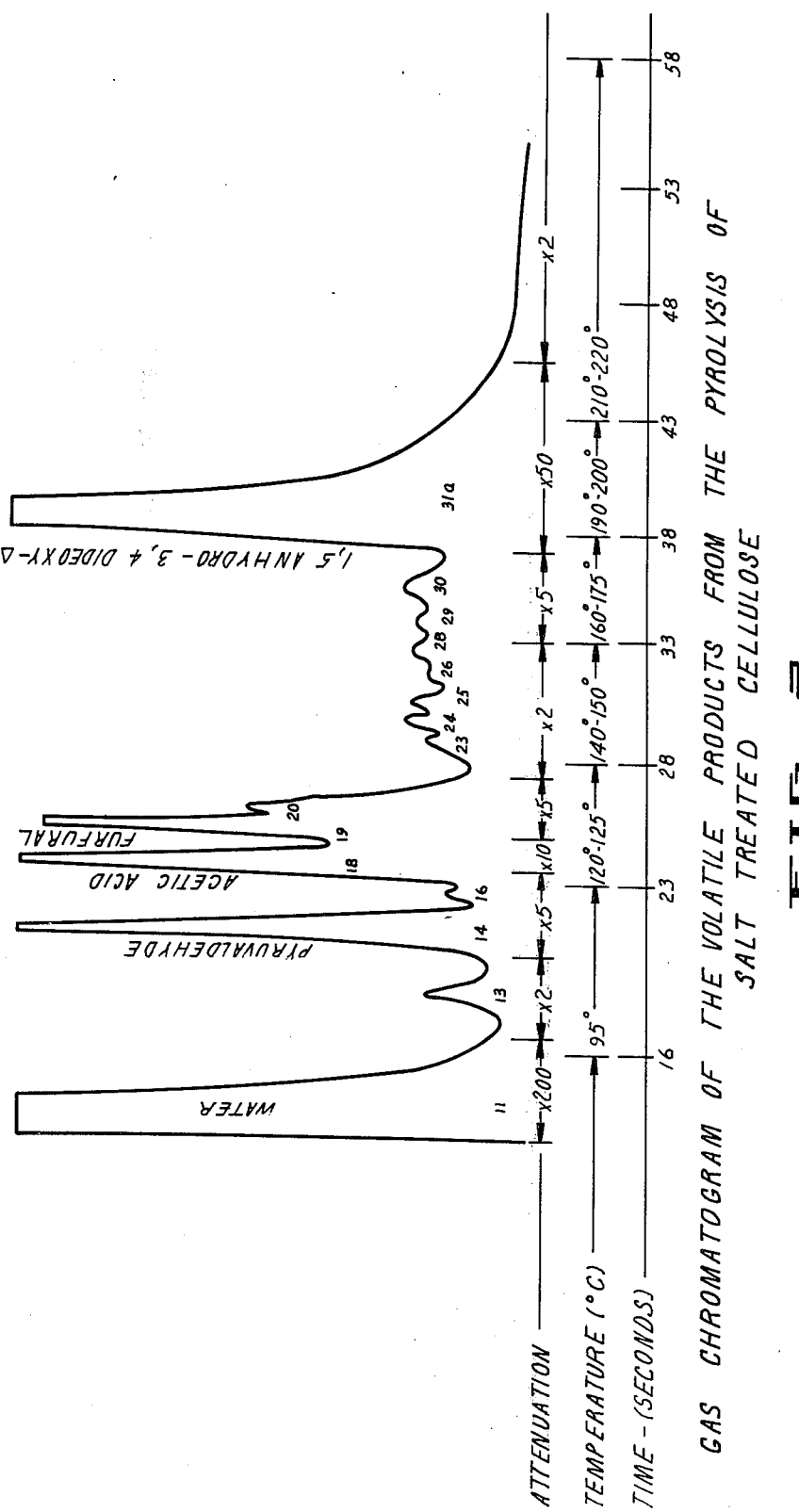
FIG. 2 GAS CHROMATOGRAM OF THE VOLATILE PRODUCTS FROM THE PYROLYSIS OF SALT TREATED CELLULOSE

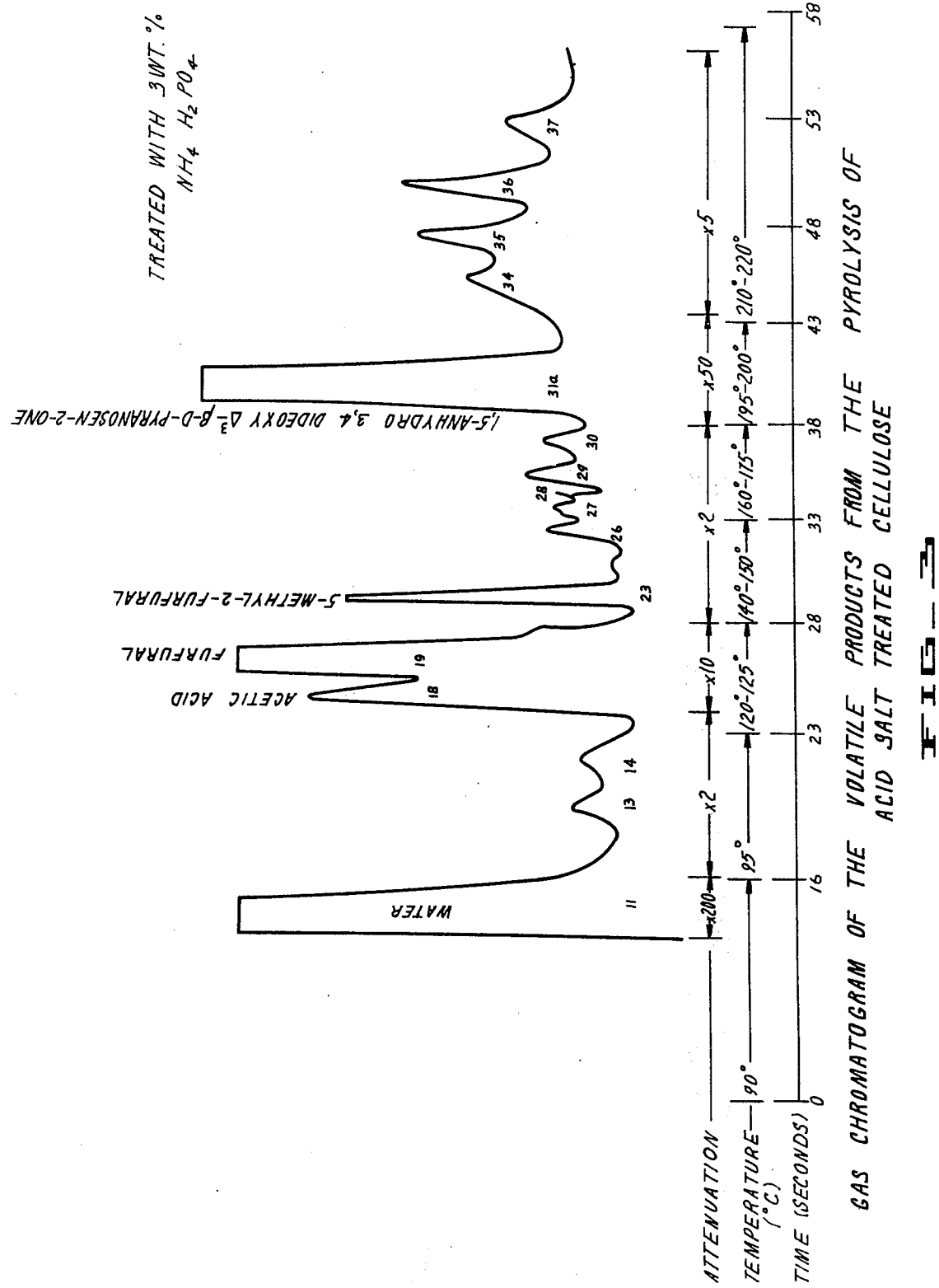

CONTROLLED PYROLYSIS OF CELLULOSIC MATERIALS FOR PRODUCTION OF CHEMICALS

ORIGIN OF INVENTION

The invention herein described was made in the course of or under a contract with the Office of Civil Defense, currently known as the Defense Civil Preparedness Agency.

RELATED APPLICATION

This application is a continuation-in-part of application Ser. No. 200,514, filed Nov. 19, 1971, now abandoned.

SUMMARY OF INVENTION

The present invention relates to the provision of a method of disposing of waste cellulosic materials by pyrolysis whereby valuable chemicals can economically be recovered from the reaction product. More specifically, it has been found that by treating said cellulosic materials with acidic fire retardant chemicals before the pyrolysis takes place, the number of low molecular weight condensable products formed during pyrolysis can be reduced to but a small number of principal chemicals, along with much smaller amounts of others. In contrast, when the pyrolysis is effected in the conventional manner, without preliminary treatment of the cellulosic material with the fire retardant chemical, the resulting product mixture is made up of at least 60 compounds, none of which is present in any amount sufficiently large as to make recovery thereof economically attractive.

In addition to water, carbon dioxide, and carbon monoxide, the compounds which are produced in relatively large volumes by the method of this invention, and which can readily be recovered as low molecular weight condensates from the gases formed during pyrolysis, includes acetic acid, furfural, 5-methyl-2-furfural and 1,5-anhydro-3,4-dideoxy-$\Delta^3$-$\beta$-D-pyranosen-2-one. For convenience of description, the latter compound is referred to herein as the "pyranosenone compound." These recovered compounds have utility for a wide variety of applications. Thus acetic acid is used in the manufacture of various acetates, acetyl compounds, cellulose acetate, and acetate rayon, among other applications. Furfural may be used in the manufacture of furfural-phenol plastics, in solvent refining of petroleum oils, and as solvents for various materials including nitrated cotton and cellulose acetate, and 5-methyl-2-furfural can be used for many of these same applications. These compounds are also employed in the synthesis of furan derivatives. The pyranosenone compound, which is produced in attractive yields, readily undergoes hydroxylation when reacted with mild oxidizing agents to produce the novel pyranosenone derivative compound 1,5-anhydro-3,4-dihydroxy-$\Delta^3$-$\beta$-D-pyranose-2-one, which can then be employed in the formation of a variety of resins and surfactants, e.g., as a curing agent for epoxy resins. This hydroxylation reaction can be represented as follows:

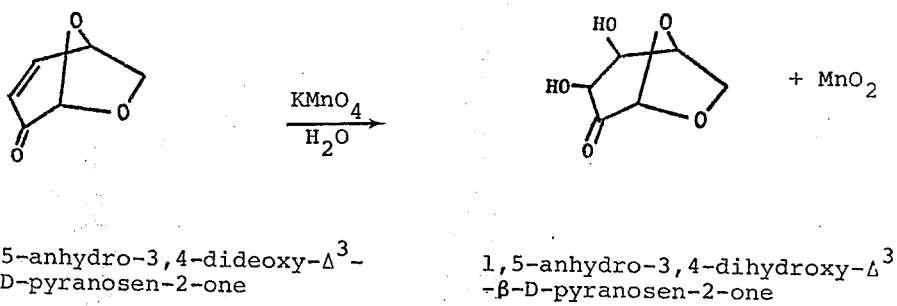

1,5-anhydro-3,4-dideoxy-$\Delta^3$-$\beta$-D-pyranosen-2-one 1,5-anhydro-3,4-dihydroxy-$\Delta^3$-$\beta$-D-pyranosen-2-one The cellulosic materials employed as feed stocks in the process of this invention can take a variety of forms and are usually of a waste character. Included, for example, are papers of one type or another, newsprint, fiberboard, paperboard, cardboard, sawdust, chips or other wood pieces, and, in general, any material which contains a cellulosic component. In most cases these cellulosic feed materials will be shredded or otherwise comminuted to facilitate the chemical impregnation and pyrolysis steps of the present invention.

The chemical treating agents employed in the invention are those of an acidic character which are conventionally employed as fire retardants. However, when employed for the latter purpose they are used in significantly larger amounts than is here the case. Included are the various acids and salts which are acidic in aqueous solution. Representative chemicals with which good results can be obtained are phosphoric acid, monoammonium phosphate, diammonium phosphate, ammonium sulfate and zinc sulfate, for example, as well as other compounds with sulfate or phosphate anions or those with an ammonium cation. The chemical employed should be one which is capable of reacting with the hydroxyl groups present in the cellulose molecule to form a relatively stable bond as pyrolysis is initiated. Other appropriate fire retardant chemicals will also suggest themselves to those skilled in the art, and whether or not a given chemical finds utility in the present invention can readily be determined by routine experimentation in the light of the present teachings.

The concentration of the aqueous solution of fire retardant chemical employed to treat the cellulosic said material to be pyrolyzed is not critical and may well vary from one cellulosic material to another. The amount used is that which is effective to restructure the normal product mixture obtained on pyrolysis so as to provide enhanced yields of the desired product compounds, as recited above. Good results have been obtained in all cases when providing the cellulosic feed materials with from about 0.5 to about 5 percent by weight of the chemical. Amounts smaller than 0.5 tend to be relatively ineffective, which amounts significantly larger than 5% become unduly expensive and do not materially enhance the product mixture. These percentages are measured on a dry weight basis which does not take into effect the water added to the cellulosic material along with the chemical during the impregnation step. Typical concentrations of the fire retardant chemical in the aqueous treating solution for use in treating the cellulosic feed materials will range from about 0.5 to about 15 percent by weight of the treating chemical.

In carrying out this invention, the cellulosic material is uniformaly impregnated with an aqueous solution of one or more acidic compounds of the type conventionally employed as fire retardants, as noted above. The resulting material is air dried and then subjected to pyrolysis in a suitable retort. The pyrolysis can be effected in either an aerobic or an anaerobic environment, and in an open or a closed retort; further, the materials can be subjected to direct combustion in the retort, or combustion can be effected by the application of external heat to the retort in which the materials are contained. Pyrolysis can be effected either in batch fashion or in a continuous or semi-continuous method as the treated cellulosic materials are passed through a retort zone which can, for example, be of the fluidized bed type. The temperature generated within the treated cellulosic material during pyrolysis should preferably not exceed about 400°C if maximum recovery of the desired chemical reaction products is to be obtained.

As pyrolysis proceeds the cellulosic material is converted to gaseous and vaporous products, leaving a carbonaceous residue. The desired chemical products formed during pyrolysis are collected by condensation from the gas stream evolved from the retort, and are subsequently separated from one another by conventional methods such as distillation, solvent extraction, or the like. Thus, acetic acid has a boiling point of 118°C, furfural a boiling point of 161.7°C, while the pyranosenone compound has a boiling point of approximately 250°C. The latter compound is a light yellow liquid which is heavier than water and is insoluble in hot or cold water, slightly soluble in chloroform or benzene and readily soluble in acetone or dioxane.

The carbonaceous residue mentioned above has utility as a fertilizer material, its value in this connection being particularly enhanced when the impregnating chemical is one containing phosphorus.

The difference between the makeup of the lower molecular weight pyrolysis products of untreated cellulose as that of similar pyrolysis products of cellulose treated in accordance with the present invention clearly appears from an examination of the figures of the appended drawings wherein:

FIG. 1 represents a gas chromatogram of the lower molecular weight materials from the pyrolysis of untreated α-cellulose;

FIG. 2 represents a gas chromatogram of the lower molecular weight materials from the pyrolysis of α-cellulose treated with 3% by weight of ammonium sulfate; and FIG. 3 represents a gas chromatogram of the lower molecular weight materials from the pyrolysis of α-cellulose treated with 3% by weight of mono-ammonium phosphate.

In the several figures, most of the major peaks are identified by the name of the particular compound involved, and the following table provides information for essentially each of the various numbered gas chromatogram peaks either by way of particular compound identification (including boiling point and molecular weight) or by way of mass spectrum characterizing data. The change in product makeup effected by way of the present invention is readily apparent.

IDENTIFICATION OF LOWER MOLECULAR WEIGHT PYROLYSIS PRODUCTS OF UNTREATED AND ACID SALT-TREATED α-CELLULOSE

| G.C. Peak | Compound Identification or Mass Spectrum Data | Boiling Point °C | Molecular Weight |
|---|---|---|---|
| 1 | Fixed gases | | |
| 2 | Pentene | 36 | 70 |
| 3 | Acetaldehyde | 21 | 44 |
| 4 | Furan | 32 | 68 |
| 5 | Acetone | 56 | 58 |
| 5 | Acrolein | 53 | 56 |
| 6 | 2-methylfuran | 62 | 82 |
| 7 | Butyraldehyde | 76 | 72 |
| 8 | Methyl ethyl ketone | 79 | 72 |
| 8 | Benzene | 80 | 78 |
| 9 | 2,5-dimethylfuran | 94 | 96 |
| 10 | 2,3-butanedione | 88 | 86 |
| 11 | Water | 100 | 18 |
| 12 | Cyclopentanone | 130 | 84 |
| 13 | Cyclooctatetraene | 143 | 104 |
| 14 | Acetol | 146 | 74 |
| 15 | 31,29,58,16,56 | | |
| 16 | 39,82,27,54,53 | | |
| 17 | 29,58,30,44,31 | | |
| 18 | Acetic Acid | 118 | 60 |
| 19 | Furfural | 162 | 96 |
| 20 | 43,31 | | |
| 21 | 44,29,16,43,12 | | |
| 22 | 57,43,29,44 | | |
| 23 | 5-methyl-2-furfuryl | 181 | 110 |
| 24 | Furfuryl alcohol | 171 | 98 |
| 24 | 73,45,31,29,43 | | |
| 25 | Butyrolactone | 206 | 86 |
| 26 | 55 | | |
| 27 | 55,84,27,26,39 | | |
| 28 | 2-hydroxy-3-methyl-c-cyclopentene-1-one | | |
| 29 | 55,27,126,41,43 | | |
| 30 | O-cresol | 191 | 108 |
| 30 | Phenol | 182 | 94 |
| 31 | p-cresol | 202 | 108 |
| 31 | M-cresol | 203 | 108 |
| 31 | 2,5-dimethylphenol | 211 | 122 |
| 31a | 1,5-anhydro-3,4-dideoxy-Δ³-β-D-pyranosen-2-one | 250 | 98 |
| 32 | 3,4-dimethylphenol | 225 | 122 |
| 36 | 69,29,57 | | |
| 37 | 81,29,30,27,45 | | |
| 38 | 5-hydroxymethylfurfural | 110 | 126 |

The gas chromatogram of the volatile products from the pyrolysis of newsprint (a mixture of 25% pulp and 75% ground wood) treated with 3% by weight of monoammonium sulfate is much like that of FIG. 2 except that peak 26 is more pronounced.

In carrying out the process of this invention it has been found that approximately 50 to 60 weight percentage of the pyrolyzed cellulosic material may be converted to low molecular weight condensables, while approximately 40 weight percent thereof is recovered as a carbonaceous residue. In typical operations this condensable fraction is found to contain about 60 weight percent water, about 15 to 20 weight percent of the pyranosenone compound and small percentages of each of acetic acid, furfural and 5-methyl-2-furfural. Based on the air dried weight of the starting cellulosic material, the yield of the pyranosenone compound is about 7–10% and it is reasonable to expect that this yield can be still further improved by the optimization of pyrolysis conditions. For example, increased yields could be obtained by conducting pyrolysis in a fluidized sand bed where a constant supply of nitrogen or air prevents accumulation of decomposition products in the reactions chamber, thereby minimizing secondary reactions. In addition, particular systems may require particular conditions of temperature, concentration of the fire retardant chemical and partial pressures of oxygen and water to obtain maximum yields of the desire pyranosenone compound. It should be noted that pyrolysis of the latter compound occurs, both in the neat form and in the presence of the acidic fire retardant additives of the present invention at temperatures significantly above 400°C, and especially at higher temperatures such as 480°C.

The following examples are illustrative of the invention:

EXAMPLE 1

This operation involved the pyrolysis of shredded, pure α-cellulose which had been first soaked in 2% aqueous monoammonium phosphate, then pressed between absorbent tissues to remove excess liquid, and finally air-dried to a constant weight. The cellulose samples thus treated retained 3% by weight of the salt. Approximately 17 g of this treated cellulose material were placed in a 125 ml distillation flask and heated with a Bunsen burner. The pyrolyzate was collected in a 15 ml centrifuge tube which was cooled by a liquid nitrogen bath. The pyrolysis was continued until the samples were completely charred and there was no evidence of further generation of condensable products. Approximately 8.0 g of the liquid products were collected. The tube was then allowed to warm to room temperature, and the mixture was separated with the aid of a preparatory gas chromatograph. A 3.0 ml aliquot was injected with a syringe onto a 7½-ft × ¾-in column packed with 10% Carbowax 20M on 80/100 mesh Chromosorb. Weith a helium rate of 330 ml/min, the column was ballistically temperature programmed from 100° to 200°C. The injection port and the buffer zone were maintained at 250°C, the detector block was held at 230°C, and the temperature of the manifold was maintained at 225°C. A thermal conductivity detector at 150 ma, was used to record a chromatogram. A series of glass traps leading from the manifold and submerged in an ice bath were used to collect the major compounds contained in the mixture. The only major compounds so found were water, acetic acid, furfural and the pyranosenone compound, 1,5-anhydro-3,4-dideoxy-$\Delta^3$-$\beta$-D-pyranosen-2-one. Based on the total weight of condensables obtained, the approximate yield of these chemicals is as follows:

| | | |
|---|---|---|
| $H_2O$ | — | 60% |
| pyranosenone compound | — | 15% |
| acetic acid | — | 3% |
| furfural | — | 3% |

EXAMPLE 2

The procedure of Example 1 is repeated, but using shredded newsprint, composed of 25% pulp and 75% ground wood, instead of α-cellulose. Here the principal products collected, and the yields thereof, are as follows:

| | | |
|---|---|---|
| $H_2O$ | — | 60% |
| pyranosenone compound | — | 15% |
| acetic acid | — | 3% |
| furfural | — | 6% |
| 5-methyl furfural | — | 3% |

EXAMPLE 3

The procedure of Example 1 is again repeated, but with pine shavings rather than α-cellulose. Here the principal products collected, and the yields thereof, are as follows:

| | | |
|---|---|---|
| $H_2O$ | — | 60% |
| pyranosenone compound | — | 15% |
| acetic acid | — | 3% |
| furfural | — | 3% |

I claim:
1. 1,5-anhydro-3,4-dideoxy-$\Delta^3$-$\beta$-D-pyranosen-2-one.
2. 1,5-anhydro-3,4-dihydroxy-$\Delta^3$-$\beta$-D-pyranosen-2-one.

3. A method for the pyrolysis of cellulosic material to enhance the production, during pyrolysis, of at least acetic acid, furfural and 1,5-anhydro-3,4-dideoxy-$\Delta^3$-$\beta$-D-pyranosen-2-one, which comprises impregnating the cellulosic material with an aqueous solution of at least one agent selected from the group consisting of phosphoric acid, monoammonium phosphate, diammonium phosphate, ammonium sulfate, and zinc sulfate, said agent being employed in the amount of from about 0.5 to 5%, based on the weight of the cellulosic material, and being characterized by the ability to react with hydroxyl groups present in cellulosic molecules to form a relatively stable bond therewith as pyrolysis is initiated, and subjecting the cellulosic material containing the agent to pyrolysis.

* * * * *